June 24, 1958 W. C. BELK 2,840,236
SIZING MACHINE
Filed Oct. 22, 1953 2 Sheets—Sheet 1
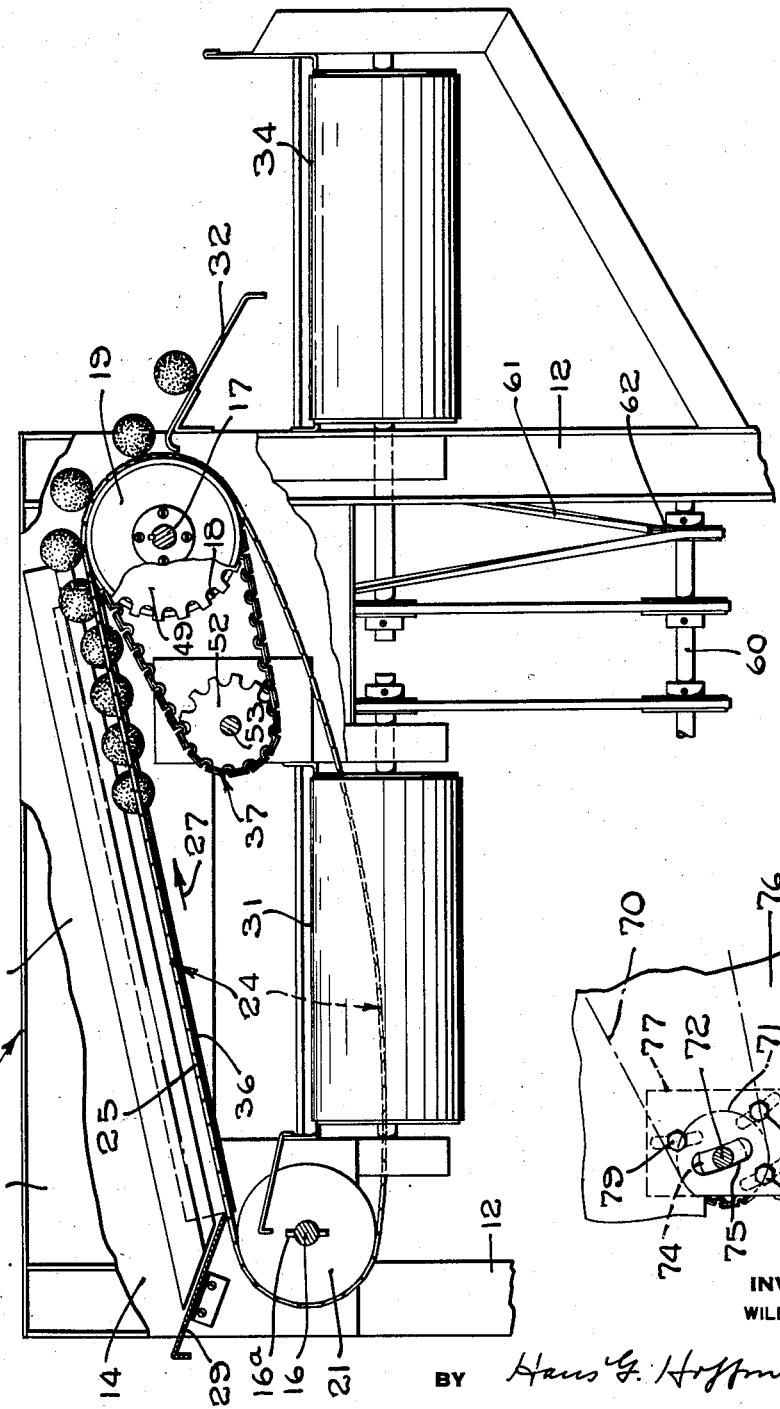
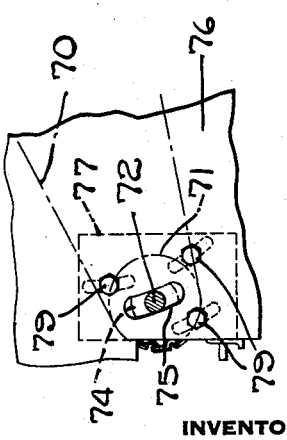
INVENTOR
WILBER C. BELK
BY Hans G. Hoffmeister
ATTORNEY June 24, 1958 W. C. BELK 2,840,236
SIZING MACHINE
Filed Oct. 22, 1953 2 Sheets-Sheet 2
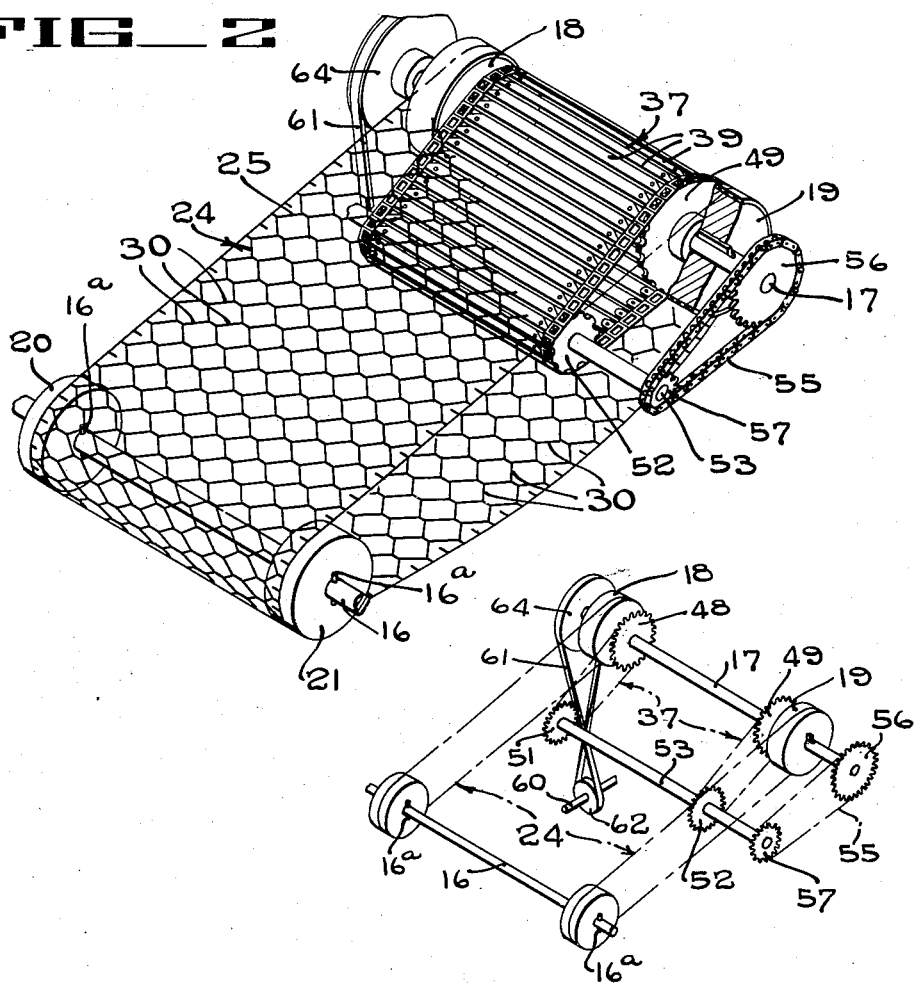
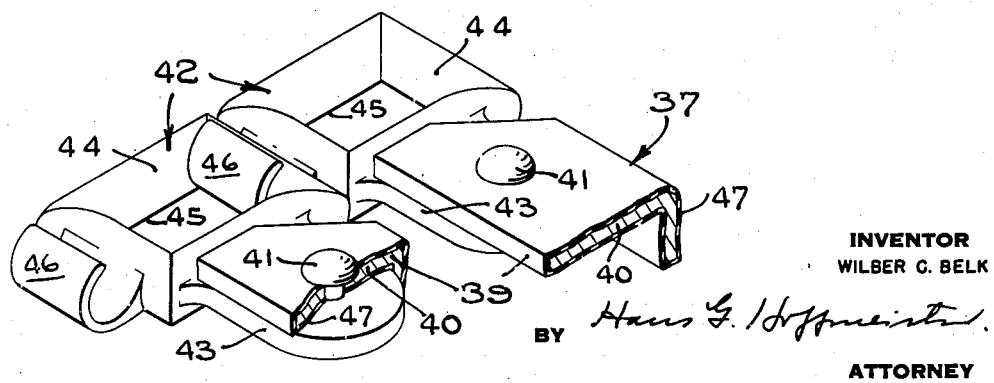
INVENTOR
WILBER C. BELK
BY Hans G. Hoffmeister
ATTORNEY United States Patent Office 2,840,236
Patented June 24, 1958

2,840,236

SIZING MACHINE

Wilber C. Belk, Lakeland, Fla., assignor to Food Machinery and Chemical Corporation, San Jose, Calif., a corporation of Delaware Application October 22, 1953, Serial No. 387,615

6 Claims. (Cl. 209—84)

This invention appertains to apparatus for processing fruit, vegetables, and the like and more particularly relates to an improved apparatus for grading fruit or vegetables according to size.

It is an object of the present invention to provide an improved machine for efficiently grading fruit according to size without damaging the fruit.

Another object of this invention is to provide positive acting means for removing oversize fruit from the sizing openings of a continuous belt type sizing machine after the fruit has been graded.

Other and further objects and advantages of the present invention will become apparent from the following detailed description taken in connection with the accompanying drawings, in which:

Figure 1 is a side elevation, partly in section and partly broken away, of a sizing machine constructed in accordance with the teachings of the present invention.

Figure 2 is a fragmentary perspective of the fruit sizing belt and the fruit lifting belt of the machine of Figure 1 shown detached from the sizing machine frame structure.

Figure 3 is a diagrammatic sketch of the drive mechanism of the sizing machine of Figure 1.

Figure 4 is an enlarged fragmentary perspective, partly in section, of a portion of the lifting belt of Figure 2.

Figure 5 is an enlarged fragmentary side elevation of a modified form of the sizing machine of the present invention.

While the sizing machine of the present invention is particularly adapted for sizing fruit, such as tangerines, it has general utility in the grading of other objects, such as vegetables. The term fruit will be used in the following specification and claims to generically indicate all articles which may be sized by this machine.

In Figure 1 the reference numeral 10 indicates generally a support structure in which the operating mechanism of the sizing machine of the present invention is mounted. This support structure may be of any suitable type and is herein shown as comprising a plurality of vertical support posts 12 on the upper portion of which vertical side wall panels 13 and 14 are secured which are spaced to define an elongated chamber 15 therebetween. At the rearward end of the chamber, a shaft 16 is secured in stationary position between the side walls 13 and 14. Near the forward end of the chamber a transverse shaft 17 extends between the side walls 13 and 14 parallel to the stationary shaft 16 but at a higher elevation. The shaft 17 is rotatably journalled at either end in bearing assemblies (not shown) secured in the side walls.

A pair of pulleys 18 and 19 (Figure 3) are keyed in spaced relation on the rotatable shaft 17 while a pair of similar pulleys 20 and 21 are freely journalled on the stationary shaft 16 and are held in spaced relation thereon by pins 16a. An endless chain type sizing belt 24 extends entirely across the chamber 15 between the side walls 13 and 14 and is trained around the pulleys 18 and 19 at one end and around the pulleys 20 and 21 at the other end. All of the pulleys are provided with a peripheral contact surface of frictional material, such as belting, to effect a driving engagement with the chain surface of the belt 24.

As seen in Figure 1, the upper run 25 of the belt 24 travels in the upward direction indicated by the arrow 27 and is arranged to receive fruit to be sized from an inlet or feed chute 29. The belt 24 is so constructed as to provide a plurality of openings 30 (Figure 2) of a size to permit the passage therethrough of fruit smaller than a predetermined desirable size and to retain fruit larger than the predetermined size. The fruit passing through the openings is collected on an endless belt conveyor 31 (Figure 1) for conveyance to another processing station. An oversize piece of fruit retained in an opening 30 of the sizing belt 24 will, depending upon its size, project a certain distance below the belt while it is carried upwardly and forwardly in the chamber 15 toward the discharge end of the belt 24 for discharge over the end onto an apron 32 secured on the frame 10. The apron 32 is arranged to direct fruit to an endless belt conveyor 34 which takes the oversize fruit to another processing station. The conveyors 31 and 34 may be of any commercial type suitably mounted on the support structure 10. Conventional guide plates are supplied to direct the fruit onto the various conveyor belts and to retain the fruit thereon. Similarly, suitable brackets are provided to support the upper run of the conveyor belts, such as the bracket 36 (Figure 1) which supports the upper run of the sizing belt 24.

The oversize fruit, that is wedgingly retained in the openings 30 of the belt 24, is gently lifted out of the openings before it reaches the discharge end of the belt 24 by means of a lifting belt 37. As seen in Figures 2 and 4, the lifting belt 37 comprises a plurality of transverse slat units 39. Each slat unit is made up of a slat 40 secured at each end by a rivet 41 to an attachment link 42, which has a ledge 43 to which the slat is secured and a square body portion 44 with a central opening 45. Each link 42 has a hook-shaped arm 46 formed integrally on the trailing edge thereof and adapted to be disposed in hooked engagement in the attachment link 42 disposed immediately behind. The slats 40 are enclosed in a rubber coating 47 which provides a resilient, fruit contacting surface.

At its forward end, the articulated lifting belt 37 is trained around two large sprockets 48 and 49 rotatably journalled in spaced relation on the drive shaft 17. The teeth of the sprockets are arranged to extend through the openings 45 in the links 42. At its rearward end the belt 37 is trained around two relatively small sprockets 51 and 52 which are keyed on a drive shaft 53, which extends transversely between the side walls 13 and 14 and is suitably journalled for rotation therein. The drive shaft 53 is driven from the drive shaft 17 by means of a chain 55 (Figures 2 and 3) trained around a large sprocket 56 keyed on the drive shaft 17 and a relatively small sprocket 57 keyed on the shaft 53. The drive shaft 17 is in turn driven from a power take-off shaft 60 (Figure 1) by means of a V-belt 61 which is trained around a pulley 62 keyed to the take-off shaft 60 and around a pulley 64 (Fig. 3) keyed to one end of the drive shaft 17.

It will be readily seen that, since both the sizing belt 24 and the lifting belt 37 are driven from a common source of power, the relative linear speed of the two belts may be accurately controlled by the selection of sprockets and pulleys of suitable effective diameters. To most efficiently lift the oversize fruit from the openings in the sizing belt it is necessary that the fruit be rocked or rolled in the openings at the same time as it is being forced upwardly therein. In the present invention the movement of the fruit in the openings is obtained by arranging the drive mechanism so that the lifting belt 37 travels at a slightly greater linear speed than the linear speed of the sizing belt 24. As the faster traveling lifting belt contacts a piece of fruit it imparts a thrust to the fruit in the direction of travel of the sizing belt. The resulting rocking of the fruit causes it to be rolled out of the opening just before it reaches the discharge end of the sizing belt.

Since the sizing machine is intended for use with a range of different fruits and vegetables, it is desirable that the position of the lifting belt can be adjusted to vary the angle at which the upper run of the lifting belt approaches the under side of the upper run of the sizing belt. In Figure 5, an arrangement is shown wherein the rearward end of a lifting belt 70 is trained around a pair of sprockets 71 (one only being illustrated) keyed on a shaft 72 which is rotatably mounted at each end in a bearing assembly 74. The shaft extends through an arcuate slot 75 in each side wall member 76 of the machine. Each bearing assembly 74 is mounted on a plate 77 which may be adjustably secured to the side wall 76 by means of bolts 79. With this arrangement the shaft 72 may be swung through a predetermined arc to vary the inclination of the upper run of the lifting belt.

From the foregoing description it will be seen that there is provided in this invention a novel, efficient mechanism for gently lifting fruit from the sizing openings in a continuous belt type sizing machine. The use of a lifting belt which travels at a greater speed than the sizing belt assures that each piece of fruit will be rolled out of the retaining opening in the sizing belt, no matter how tightly it is wedged therein, before the discharge end of the belt is reached. Since all of the fruit is positively separated from the sizing openings there is no possibility of damage to the fruit as it is discharged over the end of the belt.

It will be understood that modifications and variations may be made without departing from the scope of the present invention.

Having thus described my invention, what I claim as new and desire to protect by Letters Patent is:

1. A sizing machine comprising a support structure, a drive shaft rotatably mounted in said support structure, first rotary drive means keyed to said shaft, an endless sizing belt mounted in said support structure and disposed in driven engagement with said rotary drive means for movement in a predetermined direction and having a plurality of openings arranged to permit passage through the upper run of the belt of fruit smaller than a predetermined size and to retain fruit larger than said predetermined size, a pair of spaced sprockets rotatably mounted on said drive shaft, an endless lifter belt trained around said sprockets and disposed below said sizing belt, the upper run of said lifter belt being arranged to move upwardly toward the underside of the upper run of said sizing belt and forwardly in the same direction as said sizing belt to pass under said sizing belt in spaced relation therewith to engage fruit disposed in said sizing belt openings and progressively lift the fruit out of said openings, and means operatively connected between said drive shaft and said lifter belt for driving said lifter belt from said drive shaft at a faster linear speed than the speed of said sizing belt.

2. A sizing machine comprising a support structure, a drive shaft rotatably mounted transversely on said support structure, a pair of spaced friction pulleys keyed to said drive shaft, an endless sizing belt extending longitudinally in said support structure and having the discharge end of the sizing belt disposed around said friction pulleys to be driven thereby, said sizing belt having a plurality of openings therein arranged to permit passage of a portion of the fruit deposited on the upper run of the sizing belt and to retain and advance another portion of the fruit toward the discharge end of the sizing belt, a pair of spaced sprockets mounted for rotation on said drive shaft between said pulleys, an endless lifter belt mounted in said support structure below said sizing belt having one end trained around said sprockets, said lifter belt having an upper run arranged for movement upwardly toward said sizing belt and forwardly in the direction of movement of the sizing belt, said sprockets being proportioned relative to said friction pulleys so that the portion of the lifter belt trained around said sprockets lies below and closely adjacent that portion of the sizing belt disposed around the friction pulleys, means for rotating said drive shaft to effect linear movement of said sizing belt, and means operatively connected between said drive shaft and said lifter belt to move said lifter belt at a linear speed greater than the linear speed of said sizing belt.

3. A sizing machine comprising a support structure, a drive shaft rotatably mounted transversely on said support structure, a pair of spaced rotary drive members keyed to said drive shaft, an endless sizing belt extending longitudinally in said support structure and having the discharge end of the sizing belt disposed around said rotary drive members to be driven thereby, said sizing belt having a plurality of openings therein arranged to permit passage of a portion of the fruit deposited on the upper run of the sizing belt and to retain and advance another portion of the fruit toward the discharge end of the sizing belt, a pair of spaced sprockets mounted for rotation on said drive shaft between said pulleys, an endless lifter belt mounted in said support structure below said sizing belt having one end trained around said sprockets, said lifter belt having an upper run arranged for movement upwardly toward said sizing belt and forwardly in the direction of movement of the sizing belt, said sprockets being proportioned relative to said rotary drive members so that the portion of the lifter belt trained around said sprockets lies below and closely adjacent that portion of the sizing belt disposed around the rotary drive members, means for rotating said drive shaft to effect linear movement of said sizing belt, and means operatively connected between said drive shaft and said lifter belt to move said lifter belt at a linear speed greater than the linear speed of said sizing belt.

4. A sizing machine comprising a support structure, a drive shaft rotatably mounted on said structure, rotary drive means keyed to said drive shaft, a sizing belt mounted in said structure and trained over said rotary drive means to be driven thereby, a countershaft mounted in said structure in spaced parallel relation to said drive shaft, a first pair of spaced sprockets keyed to said countershaft, a second pair of spaced sprockets rotatably journalled on said drive shaft, a lifter belt trained around said two pairs of sprockets and disposed below said sizing belt, said lifter belt having an upper run arranged for movement upwardly toward said sizing belt, said second pair of sprockets being proportioned relative to said rotary drive means so that the portion of said lifter belt trained around said second pair of sprockets passes closely adjacent the underside of said sizing belt, and means for driving said countershaft from said drive shaft.

5. A sizing machine comprising a support structure, a drive shaft journalled in said structure, a pair of spaced rotary drive members keyed to said drive shaft, an endless sizing belt extending longitudinally in said structure and having a discharge end portion disposed in driven engagement around said spaced rotary drive members, a countershaft disposed in said structure in spaced parallel relation to said drive shaft, rotary drive means keyed to said countershaft, rotary idler means journalled on said drive shaft between said spaced rotary drive members, an endless lifter belt trained around said rotary drive means and around said idler means, said lifter belt being disposed below said sizing belt and having an upper run arranged for movement upwardly toward said sizing belt and forwardly in the direction of movement of said sizing belt, means adjustably mounting said countershaft in said support structure for movement in a direction to vary the inclination of the upper run of said lifter belt, and means for driving said drive shaft and said countershaft.

6. A sizing machine comprising an endless sizing belt having a plurality of sizing openings adapted to pass fruit of a certain size and to retain oversize fruit with a portion of the fruit projecting through said opening, said sizing belt having an upper run arranged to move forwardly to carry fruit retained in said sizing openings toward one end of the sizing belt for discharge over the end of the belt, a rotary idler member disposed below said upper run, a rotary drive member spaced below said upper run and forwardly of said idler member in the direction of movement of said sizing belt, a lifter belt having an upper run with end portions disposed around said idler member and said drive member respectively and an intermediate planar portion inclined upwardly toward the discharge end of said sizing belt, and drive means operatively connected to said lifter belt and to said sizing belt and arranged to move the lifter belt at a linear speed greater than the linear speed of the sizing belt, said lifter belt being arranged to make initial contact with the fruit carried in the sizing openings at a point on said inclined planar portion to gently raise and simultaneously roll the fruit prior to the advancement of the fruit to the discharge end of the sizing belt.

References Cited in the file of this patent

UNITED STATES PATENTS

| | | |
|---|---|---|
| 1,097,439 | Jaquette | May 19, 1914 |
| 1,575,424 | Frazine et al. | Mar. 2, 1926 |
| 2,100,959 | Hurxthal | Nov. 30, 1937 |
| 2,153,688 | Fitzgerald | Apr. 11, 1939 |
| 2,213,387 | De Back | Sept. 3, 1940 |
| 2,369,723 | Denlinger | Feb. 20, 1945 |

FOREIGN PATENTS

| | | |
|---|---|---|
| 811,125 | France | Jan. 14, 1937 |